(12) United States Patent
Wang

(10) Patent No.: US 10,192,163 B2
(45) Date of Patent: Jan. 29, 2019

(54) AUDIO PROCESSING METHOD AND APPARATUS BASED ON ARTIFICIAL INTELLIGENCE

(71) Applicant: Baidu Online Network Technology (Beijing) Co., Ltd., Beijing (CN)

(72) Inventor: Zhijian Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 15/725,419

(22) Filed: Oct. 5, 2017

(65) Prior Publication Data

US 2018/0204121 A1 Jul. 19, 2018

(30) Foreign Application Priority Data

Jan. 17, 2017 (CN) .......................... 2017 1 0031469

(51) Int. Cl.
*G06N 3/10* (2006.01)
*G06K 9/00* (2006.01)
*H04N 1/00* (2006.01)
*G06F 17/30* (2006.01)

(52) U.S. Cl.
CPC ........... *G06N 3/10* (2013.01); *G06F 17/3074* (2013.01); *G06F 17/30244* (2013.01); *G06K 9/00013* (2013.01); *H04N 1/00129* (2013.01); *H04N 1/00204* (2013.01)

(58) Field of Classification Search
None
See application file for complete search history.

(56) References Cited

U.S. PATENT DOCUMENTS

2015/0213808 A1* 7/2015 Disch .................. G10L 19/02
   704/500
2018/0144194 A1* 5/2018 Park ................... G06K 9/00744

FOREIGN PATENT DOCUMENTS

CN 103824555 A 5/2014
CN 105118523 A 12/2015

OTHER PUBLICATIONS

Chinese Office Action for Chinese Priority Application No. 201710031469.5, dated Feb. 1, 2018.

* cited by examiner

*Primary Examiner* — Eileen M Adams
(74) *Attorney, Agent, or Firm* — Miller, Matthias & Hull LLP

(57) ABSTRACT

The present disclosure discloses an audio processing method and apparatus based on artificial intelligence. A specific embodiment of the method comprises: converting a to-be-processed audio to a to-be-processed picture; extracting a content characteristic of the to-be-processed picture; determining a target picture based on a style characteristic and the content characteristic of the to-be-processed picture, the style characteristic being obtained from a template picture converted from a template audio; and converting the target picture to a processed audio. The present embodiment achieves the processing effect that the processed audio takes a template audio style, improves the efficiency and the flexibility of audio processing, while without changing the content of the to-be-processed audio.

19 Claims, 6 Drawing Sheets

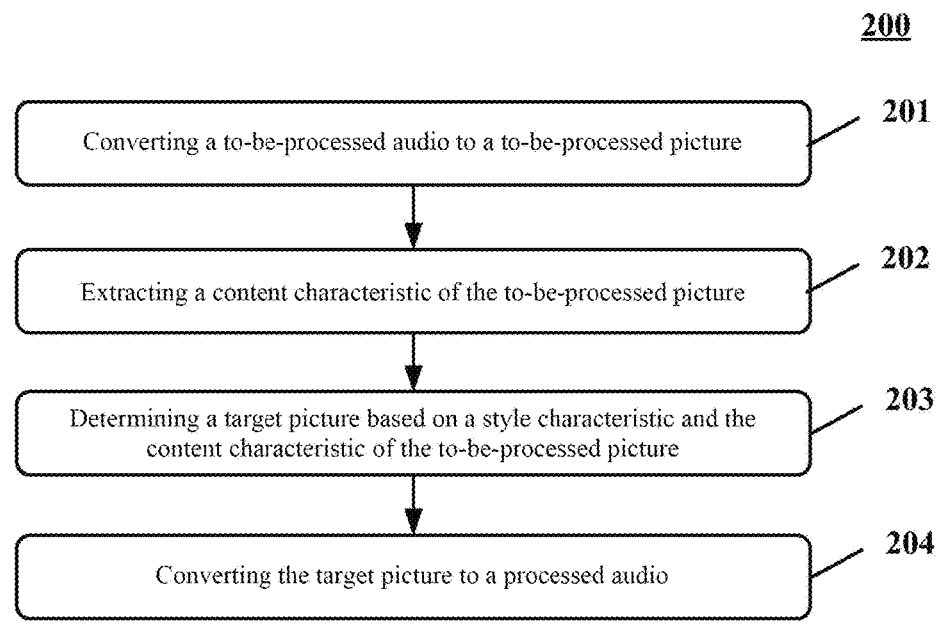
Fig. 2
 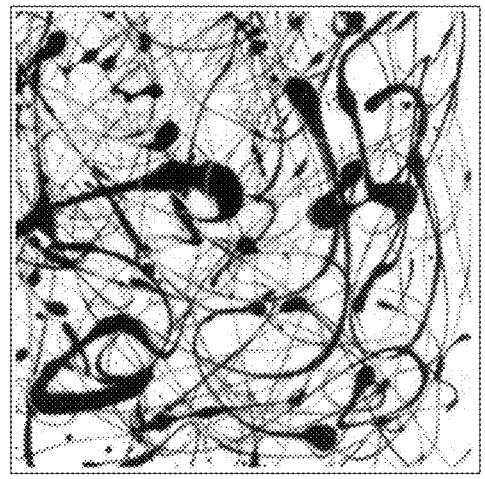
Fig. 3A                    Fig. 3B

AUDIO PROCESSING METHOD AND APPARATUS BASED ON ARTIFICIAL INTELLIGENCE

CROSS-REFERENCE TO RELATED APPLICATION

This application claims the priority of Chinese Patent Application No. 201710031469.5, entitled "Audio Processing Method and Apparatus Based on Artificial Intelligence", filed on Jan. 17, 2017, the content of which is incorporated herein by reference in its entirety.

TECHNICAL FIELD

The present disclosure relates to the field of computer technology, specifically to the field of audio processing, and more specifically to an audio processing method and apparatus based on artificial intelligence.

BACKGROUND

Artificial Intelligence, abbreviated as AI, is a new scientific technology that studies and develops theories, methods, technologies and application systems for simulating, extending and expanding human intelligence. AI is a branch of computer science that attempts to understand the essence of intelligence and produce a new intelligent machine which can react in a way similar to human intelligence. Research in this area includes robotics, speech recognition, image recognition, natural language processing, expert system and the like.

There are currently two main kinds of audio processing as follows: one is to process the audio by changing the base frequency or the format of the audio; the other is the speech synthesis. When performing the speech synthesis, the first step is to collect marked data of the template audio, then a model is trained based on the collected data. Since the model is input in text, it is required to first perform speech recognition to the to-be-synthesized audio, and then input the recognized text into the trained model to generate the audio. The first method lacks flexibility with regard to the audio processing and cannot achieve a good processing effect. The second method requires a large amount of sample audio data. Furthermore, the to-be-processed audio needs to be first converted to text during the processing, resulting in a low processing efficiency.

SUMMARY

The objective of the present disclosure is to provide an improved audio processing method and apparatus based on artificial intelligence, in order to solve any one of the technical problems mentioned in the foregoing Background section.

In a first aspect, the present disclosure provides an audio processing method based on artificial intelligence, comprising: converting a to-be-processed audio to a to-be-processed picture; extracting a content characteristic of the to-be-processed picture; determining a target picture based on a style characteristic and the content characteristic of the to-be-processed picture, the style characteristic being obtained from a template picture converted from a template audio; and converting the target picture to a processed audio.

In some embodiments, the converting a to-be-processed audio to a to-be-processed picture comprises: dividing the to-be-processed audio into audio clips at a preset interval; and determining an audiogram, a spectrum, or a spectrogram of the audio clips as the to-be-processed picture.

In some embodiments, the extracting a content characteristic of the to-be-processed picture comprises: inputting the to-be-processed picture into a pre-trained convolutional neural network, the convolutional neural network being used for extracting an image characteristic; and determining a matrix output by at least one convolutional layer in the convolutional neural network as the content characteristic of the to-be-processed picture.

In some embodiments, the style characteristic is determined through the following steps: inputting the template picture into a pre-trained convolutional neural network, the convolutional neural network being used for extracting an image characteristic; and determining a matrix output by at least one convolutional layer in the convolutional neural network as the style characteristic of the template picture.

In some embodiments, the determining a target picture based on a style characteristic and the content characteristic of the to-be-processed picture comprises: importing the content characteristic of the to-be-processed picture to a preset style transfer model, and acquiring an output of the style transfer model as the target picture.

In some embodiments, the determining a target picture based on a style characteristic and the content characteristic of the to-be-processed picture comprises: extracting a content characteristic and a style characteristic of an initial target picture; determining a content loss function based on the content characteristic of the to-be-processed picture and the content characteristic of the initial target picture; determining a style loss function based on the style characteristic of the template picture and the style characteristic of the initial target picture; determining a total loss function based on the content loss function and the style loss function; and obtaining the target picture by adjusting the initial target picture based on the total loss function.

In some embodiments, the content loss function is obtained based on a mean square error of the content characteristic of the to-be-processed picture and the content characteristic of the initial target picture.

In some embodiments, the style loss function is determined according to the following steps: determining a Gram matrix of the template picture and a Gram matrix of the initial target picture respectively, based on the style characteristic of the template picture and the style characteristic of the initial target picture; and determining the style loss function based on a mean square error of the Gram matrix of the template picture and the Gram matrix of the initial target picture.

In some embodiments, the total loss function is obtained based on a weighted sum of the content loss function and the style loss function.

In some embodiments, the obtaining the target picture by adjusting the initial target picture based on the total loss function further comprises: obtaining a minimum value of the total loss function by adjusting the initial target picture based on a gradient descent method and the total loss function; and determining the adjusted picture corresponding to the minimum value of the total loss function as the target picture.

In a second aspect, the present disclosure provides an audio processing apparatus based on artificial intelligence, comprising: a first converting unit, configured to convert a to-be-processed audio to a to-be-processed picture; an extracting unit, configured to extract a content characteristic of the to-be-processed picture; a determining unit, configured to determine a target picture based on a style characteristic and the content characteristic of the to-be-processed picture, the style characteristic being obtained from a template picture converted from a template audio; and a second converting unit, configured to convert the target picture to a processed audio.

In some embodiments, the first converting unit comprises: a dividing subunit, configured to divide the to-be-processed audio into audio clips at a preset interval; and a to-be-processed picture determining subunit, configured to determine an audiogram, a spectrum, or a spectrogram of the audio clips as the to-be-processed picture.

In some embodiments, the extracting unit comprises: an input subunit, configured to input the to-be-processed picture into a pre-trained convolutional neural network, the convolutional neural network being used for extracting an image characteristic; and a content characteristic determining subunit, configured to determine a matrix output by at least one convolutional layer in the convolutional neural network as the content characteristic of the to-be-processed picture.

In some embodiments, the apparatus further comprises: a style characteristic determining unit, configured to input the template picture into a pre-trained convolutional neural network, the convolutional neural network being used for extracting an image characteristic; and determine a matrix output by at least one convolutional layer in the convolutional neural network as the style characteristic of the template picture.

In some embodiments, the determining unit is further configured to: import the content characteristic of the to-be-processed picture to a preset style transfer model, and acquire an output of the style transfer model as the target picture.

In some embodiments, the determining unit comprises: an extracting subunit, configured to extract a content characteristic and a style characteristic of an initial target picture; a content loss function determining subunit, configured to determine a content loss function based on the content characteristic of the to-be-processed picture and the content characteristic of the initial target picture; a style loss function determining subunit, configured to determine a style loss function based on the style characteristic of the template picture and the style characteristic of the initial target picture; a total loss function determining subunit, configured to determine a total loss function based on the content loss function and the style loss function; and an adjusting subunit, configured to obtain the target picture by adjusting the initial target picture based on the total loss function.

In some embodiments, the content loss function determining subunit is further configured to: obtain the content loss function based on a mean square error of the content characteristic of the to-be-processed picture and the content characteristic of the initial target picture.

In some embodiments, the style loss function determining subunit is further configured to: determine a Gram matrix of the template picture and a Gram matrix of the initial target picture respectively, based on the style characteristic of the template picture and the style characteristic of the initial target picture; and determine the style loss function based on a mean square error of the Gram matrix of the template picture and the Gram matrix of the initial target picture.

In some embodiments, the total loss function determining subunit is further configured to: obtain the total loss function based on a weighted sum of the content loss function and the style loss function.

In some embodiments, the adjusting subunit is further configured to: obtain a minimum value of the total loss function by adjusting the initial target picture based on a gradient descent method and the total loss function; and determine the adjusted picture corresponding to the minimum value of the total loss function as the target picture.

By converting a to-be-processed audio to a to-be-processed picture, extracting a content characteristic of the to-be-processed picture, then determining a target picture based on a style characteristic and the content characteristic of the to-be-processed picture, and finally converting the target picture to a processed audio, the audio processing method and apparatus provided by the present disclosure achieves the processing effect that the processed audio takes a template audio style, improves the efficiency and the flexibility of audio processing, while without changing the content of the to-be-processed audio.

BRIEF DESCRIPTION OF THE DRAWINGS

After reading detailed descriptions of non-limiting embodiments with reference to the following accompanying drawings, other features, objectives and advantages of the present disclosure will be more apparent:

FIG. 2 is a schematic flowchart of an embodiment of an audio processing method according to the present disclosure;

FIG. 3A is a schematic diagram of a to-be-processed picture in an application scenario of the audio processing method according to the present disclosure;

FIG. 3B is a schematic diagram of a stylized picture in an application scenario of the audio processing method according to the present disclosure;

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
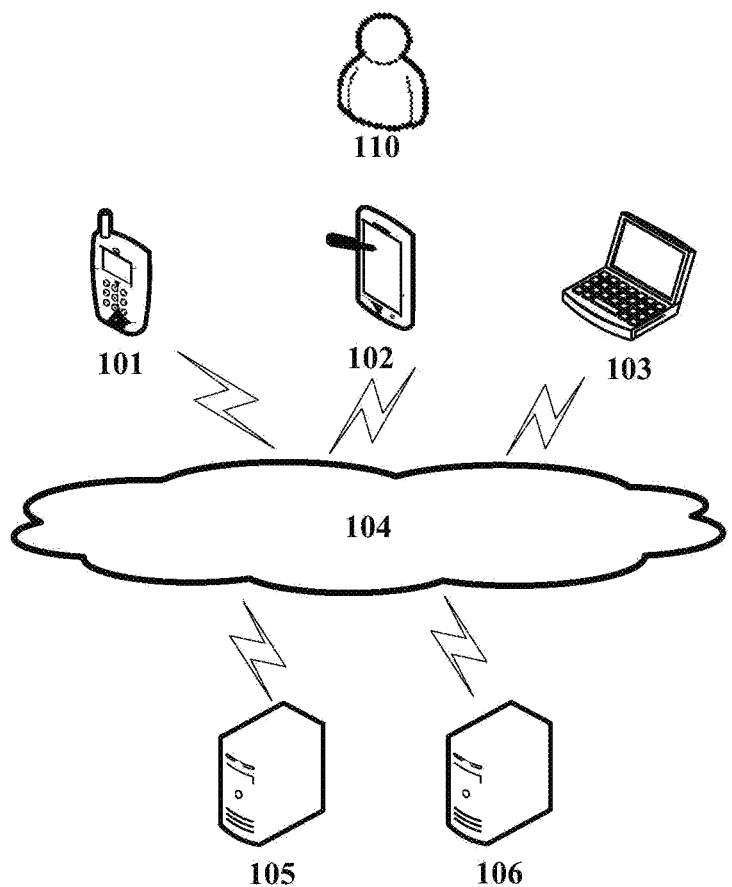
FIG. 1 is an exemplary system architecture diagram in which the present disclosure may be applied.

FIG. 1 shows an exemplary architecture of a system 100 which may be used by an audio processing method or an audio processing apparatus according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as game applications, social platform software, web browser applications, search applications, shopping applications, instant messaging tools, and mailbox clients, may be installed on the terminal devices 101, 102 and 103.

The terminal devices 101, 102 and 103 may be various electronic devices, including but not limited to, smart phones, tablet computers, e-book readers, MP3 (Moving Picture Experts Group Audio Layer III) players, MP4 (Moving Picture Experts Group Audio Layer IV) players, laptop computers and desktop computers. The terminal devices 101, 102 and 103 may acquire a to-be-processed audio input by a user, convert the to-be-processed audio to a to-be-processed picture, then extract a content characteristic of the to-be-processed picture, determine a target picture based on a style characteristic and the content characteristic of the to-be-processed picture, convert the target picture to a processed audio, and finally output the processed audio. The terminal devices 101, 102 and 103 may also acquire the to-be-processed audio input by a user, then deliver the to-be-processed audio to the backend server, and finally output the processed audio returned by the server.

The servers 105 and 106 may be servers providing various services, for example, backend servers providing support to the terminal devices 101, 102 and 103. The backend servers may convert the received to-be-processed audio to a to-be-processed picture, then extract a content characteristic of the to-be-processed picture, determine a target picture based on a style characteristic and the content characteristic of the to-be-processed picture, convert the target picture to a processed audio, and finally may feed the processed audio back to the terminal devices.

It should be noted that the audio processing method provided by the embodiments of the present disclosure may be executed by the servers 105 and 106, or may be executed by the terminal devices 101, 102 and 103. Accordingly, the audio processing apparatus may be installed on the servers 105 and 106, or may be installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

With further reference to FIG. 2, a flow 200 of an embodiment of the audio processing method according to the present disclosure is illustrated. The audio processing method comprises the following steps:

Step 201, converting a to-be-processed audio to a to-be-processed picture.

In the present embodiment, an electronic device (e.g., the terminal device or server as illustrated in FIG. 1) on which the audio processing method is operated may convert a to-be-processed audio to a to-be-processed picture. The to-be-processed audio may be recorded by a user through a terminal with a recording function, or may be an excerpt of audio that has been stored locally or in the cloud. The to-be-processed picture may be an audiogram, a spectrum, or a spectrogram of the to-be-processed audio, or a picture obtained by performing graphic transformation on the audiogram, the spectrum, or the spectrogram. The picture may be obtained by using digital audio editors.

In some alternative implementations of the present embodiment, the converting a to-be-processed audio to a to-be-processed picture may comprise: dividing the to-be-processed audio into audio clips at a preset interval; and determining an audiogram, a spectrum, or a spectrogram of the audio clips as the to-be-processed picture. Through the dividing operation, on the one hand, a stuck caused by the excessive amount of data processed at a time may be avoided, on the other hand, the to-be-processed pictures with a given size obtained after the dividing operation facilitate the follow-up processing.

Step 202, extracting a content characteristic of the to-be-processed picture.

In the present embodiment, the electronic device may extract the content characteristic of the to-be-processed picture obtained by the converting in step 201. The content characteristic may be used to reflect the contours, lines, colors and the like of the to-be-processed picture.

In some alternative implementations of the present embodiment, the extracting a content characteristic of the to-be-processed picture may comprise: inputting the to-be-processed picture into a pre-trained Convolutional Neural Network (CNN), the CNN being used for extracting an image characteristic; and determining a matrix output by at least one convolutional layer in the CNN as the content characteristic of the to-be-processed picture. The CNN is a feedforward neural network whose artificial neurons may respond to surrounding units within a part of the coverage area, and has an excellent performance at large-scale image processing. It includes a convolutional layer and a pooling layer. The CNN may complete object identification by extracting an abstract characteristic of an object by multi-layer convolution. Therefore, the content characteristic of the to-be-processed picture may be extracted by the CNN. The pre-trained CNN may use a Visual Graphics Generator (VGG) model, a Deep Residual Network (ResNet) model, etc. as a model for extracting the image characteristic.

In some alternative implementations of the present embodiment, the content characteristic of the to-be-processed picture may also be extracted by means of Wavelet Transform or the like.

Step 203, determining a target picture based on a style characteristic and the content characteristic of the to-be-processed picture.

In the present embodiment, the electronic device may determine a target picture based on a style characteristic and the content characteristic of the to-be-processed picture extracted in step 202. The style characteristic is obtained from a template picture converted from a template audio, and the template audio may be preset. The user may choose according to his preference, for example, the template audio may be an excerpt of a speech by a star, or an excerpt of a speech by a cartoon character. The template audio may also be an excerpt of user-defined audio. The target picture may be a picture that synthesizes the style characteristic of the template picture and the content characteristic of the to-be-processed picture.

In some alternative implementations of the present embodiment, the style characteristic is determined through the following steps: inputting the template picture into a pre-trained CNN, the CNN being used for extracting an image characteristic; and determining a matrix output by at least one convolutional layer in the CNN as the style characteristic of the template picture. The CNN to which the template picture is input may be identical to or different from the CNN to which the to-be-processed picture is input. After multi-layer convolution abstraction, the picture will loss the pixel-level characteristic, while retaining an advanced painting style. That is, the output of the high convolutional layer is more abstract compared to the output of the low convolutional layer, thus may be used to extract the style characteristic.

In some alternative implementations of the present embodiment, the determining a target picture based on a style characteristic and the content characteristic of the to-be-processed picture may comprise: importing the content characteristic of the to-be-processed picture to a preset style transfer model, and acquiring an output of the style transfer model as the target picture. The style transfer model may be a Generative Adversarial Network (GAN) model. The GAN includes a generation model and a discrimination model. During the training, one of the models is fixed, the parameters of the other model are updated, and such is performed alternatively and by iteration. The loss function for model training may be determined based on the content characteristic of the to-be-processed picture and the style characteristic of the template picture. The style transfer model may also be implemented based on the style transfer algorithm such as the Ashikhmin algorithm.

In some alternative implementations of the present embodiment, the determining a target picture based on a style characteristic and the content characteristic of the to-be-processed picture may comprise: extracting a content characteristic and a style characteristic of an initial target picture; determining a content loss function based on the content characteristic of the to-be-processed picture and the content characteristic of the initial target picture; determining a style loss function based on the style characteristic of the template picture and the style characteristic of the initial target picture; determining a total loss function based on the content loss function and the style loss function; and obtaining the target picture by adjusting the initial target picture based on the total loss function.

In some alternative implementations of the present embodiment, the content loss function may be obtained based on the mean square error of the content characteristic of the to-be-processed picture and the content characteristic of the initial target picture. The content loss function may also be obtained based on other computational methods that can represent the difference between the content characteristic of the to-be-processed picture and the content characteristic of the initial target picture.

In some alternative implementations of the present embodiment, the style loss function may be determined according to the following steps: determining a Gram matrix of the template picture and a Gram matrix of the initial target picture respectively, based on the style characteristic of the template picture and the style characteristic of the initial target picture; and determining the style loss function based on the mean square error of the Gram matrix of the template picture and the Gram matrix of the initial target picture. The sense of determining the style loss function based on the Gram matrix is to make the difference between different styles more prominent. The style loss function may be determined based on the correlation degree between the style characteristic of the template picture and the style characteristic of the initial target picture. Since the style characteristic may be understood as a matrix, the style loss function may be determined based on a matrix distance.

In some alternative implementations of the present embodiment, the total loss function may be obtained based on the weighted sum of the content loss function and the style loss function. By adjusting the weight of the content loss function and the weight of the style loss function, it may be determined that whether the target picture is more style-emphasized or content-emphasized.

In some alternative implementations of the present embodiment, the target picture may be obtained by adjusting the initial target picture based on the total loss function, which further comprises: obtaining the minimum value of the total loss function by adjusting the initial target picture based on the gradient descent method and the total loss function; and determining the adjusted picture corresponding to the minimum value of the total loss function as the target picture. The gradient descent is an optimization algorithm, generally referred to as the steepest descent method, which is commonly used in machine learning and artificial intelligence to recursively approximate the minimum deviation model.

In some alternative implementations of the present embodiment, the initial target picture may comprise a white noise picture, a blank picture, or a to-be-processed picture. In the process of adjusting the initial target picture to determine the target picture, the initial target picture corresponds to an independent variable of the total loss function. The purpose of the adjustment is to obtain a target picture corresponding to the minimum value of the total loss function by iteration. The initial target picture is equivalent to an initial value in the iteration and may affect the number of iterations, but is less likely to affect the final result.

Step 204, converting the target picture to a processed audio.

In the present embodiment, the electronic device may convert the target picture determined in step 203 to a processed audio. As similar to step 201, the electronic device may also convert the target picture to a processed audio by using some digital audio editors. In addition, the electronic device may store the processed audio locally, upload the processed audio to the cloud or send the processed audio to other electronic devices, and may also directly output the processed audio.

Figure 3C:
FIG. 3C is a schematic diagram of a target picture in an application scenario of the audio processing method according to the present disclosure.
Figure 3D:
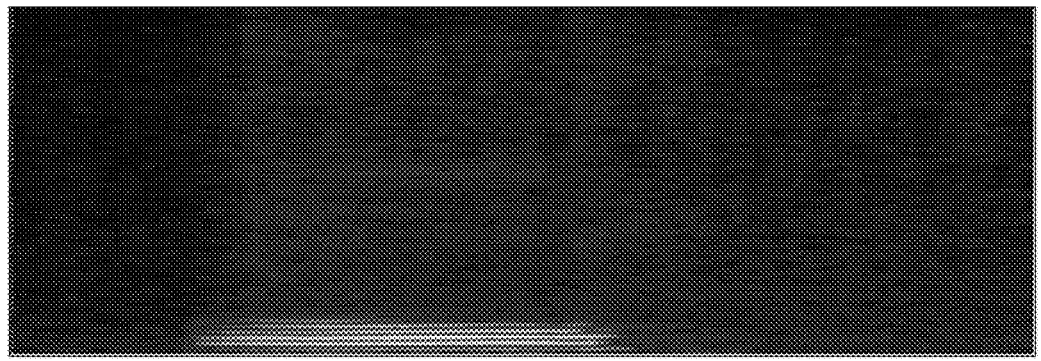
FIG. 3D is a schematic diagram of a spectrogram in an application scenario of the audio processing method according to the present disclosure.

With further reference to FIG. 3A, FIG. 3B, FIG. 3C and FIG. 3D, in the application scenario of the audio processing method according to the present disclosure, the user may use the terminal device to record an excerpt of audio or choose an excerpt of audio at will as the to-be-processed audio. After the device on which the audio processing method is operated has received the audio, it starts to process the audio, and the template audio used in the processing may be user-defined or a default template audio. The processed audio is a fusion of the to-be-processed audio and the template audio, with its content characteristic similar to the content characteristic of the to-be-processed audio but a style characteristic similar to the style characteristic of the template audio. For example, the user inputs an excerpt of his own speech, the processed audio does not change the content of the speech but sounds like with a tone of "Beijing accent" or "Taiwan accent" as embodied in the template audio after the conversion. The user may use the device on which the audio processing method is operated to fuse his own voice with the voice of a star, or convert the voice of the boyfriend and the girlfriend together to send a greeting message to friends and families, and the like. Since the effect of the audio processing is difficult to display, here the picture processing is used to denote the audio processing to produce an intuitive visual effect. FIG. 3A is a to-be-processed picture, i.e., a picture providing a content characteristic. FIG. 3B is a template picture, i.e., a picture providing a style characteristic. FIG. 3C is a target picture, i.e., a picture after style transfer. The content characteristic of the target picture is similar to the content characteristic of the to-be-processed picture, and the style characteristic of the target picture is similar to the style characteristic of the template picture. FIG. 3D is a spectrogram of an audio clip. A style transfer may be performed to the spectrogram, the audiogram or the spectrum of the audio clip, and then the spectrogram, the audiogram or the spectrum after the style transfer may be converted to an audio, that is, a processed audio is obtained.

By synthesizing the content characteristic of the to-be-processed picture converted from the to-be-processed audio and the style characteristic of the template picture converted from the template audio, the method provided by the above embodiments of the present disclosure achieves the processing effect that the processed audio takes a template audio style, improves the efficiency and the flexibility of audio processing, while without changing the content of the to-be-processed audio.

Figure 4:
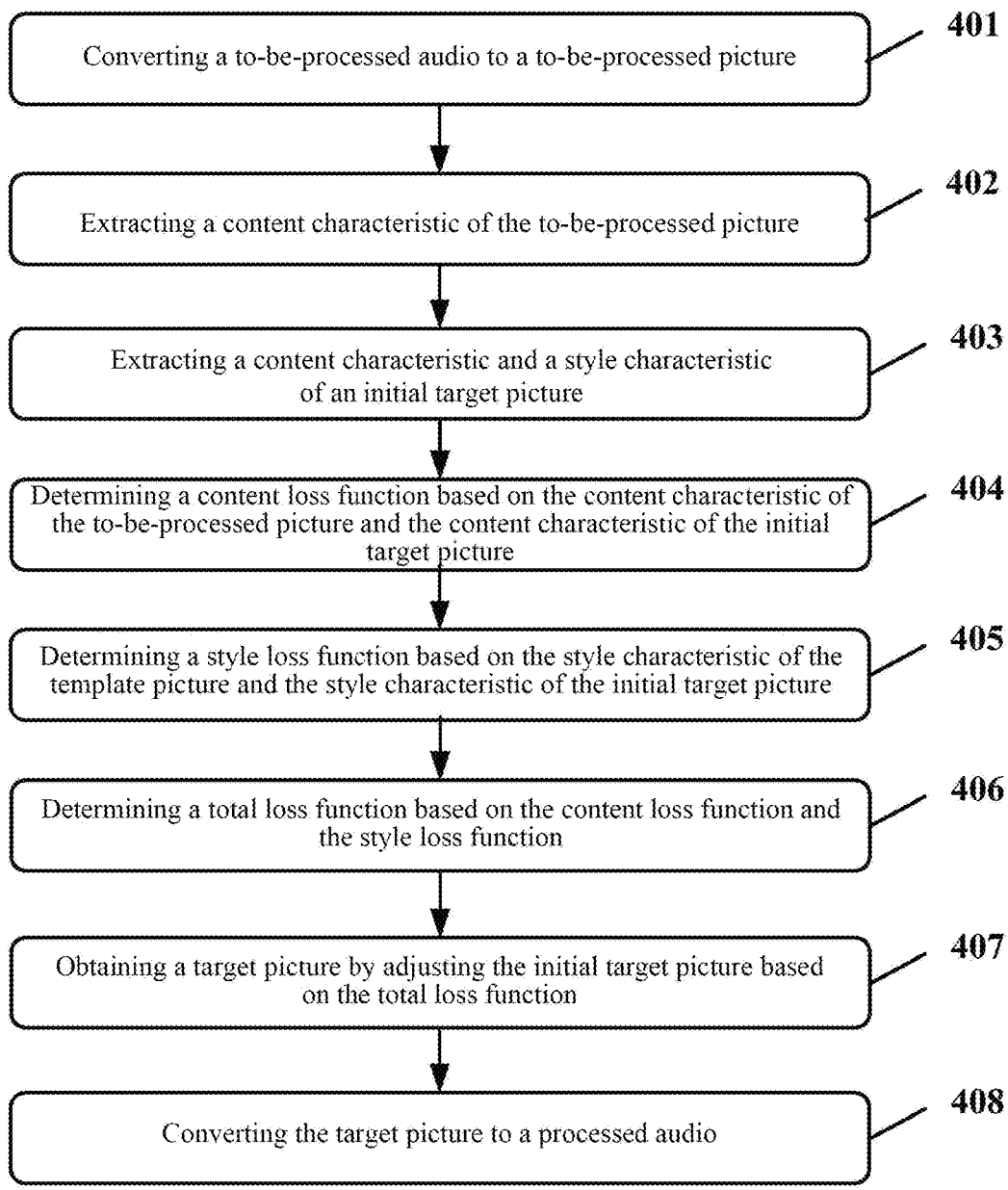
FIG. 4 is a schematic flowchart of another embodiment of the audio processing method according to the present disclosure.

Referring to FIG. 4, FIG. 4 is a schematic flowchart of another embodiment of the audio processing method according to the present disclosure.

In FIG. 4, the audio processing method 400 comprises the following steps:

Step 401, converting a to-be-processed audio to a to-be-processed picture.

In the present embodiment, an electronic device (e.g., the terminal device or server as illustrated in FIG. 1) on which the audio processing method is operated may convert a to-be-processed audio to a to-be-processed picture.

Step 402, extracting a content characteristic of the to-be-processed picture.

In the present embodiment, the electronic device may extract the content characteristic of the to-be-processed picture obtained by the converting in step 401. The content characteristic may be used to reflect the contours, lines, colors and the like of the to-be-processed picture. Specifically, the to-be-processed picture may be input into a pre-trained CNN, and the matrix output by at least one convolutional layer in the CNN is determined as the content characteristic of the to-be-processed picture.

Step 403, extracting a content characteristic and a style characteristic of an initial target picture.

In the present embodiment, the electronic device may extract the content characteristic and the style characteristic of the initial target picture. The initial target picture may be input into a pre-trained CNN to obtain its content characteristic and style characteristic. The CNN for extracting the initial target picture is preferably consistent with the CNN for extracting the to-be-processed picture, the CNN for extracting the content characteristic of the initial target picture is preferably consistent with the CNN for extracting the content characteristic of the to-be-processed picture, and the output matrix of the given convolutional layer is used as the content characteristic. Likewise, the CNN for extracting the style characteristic of the initial target picture is preferably consistent with the CNN for extracting the style characteristic of the template picture, and the output matrix of the given convolutional layer is used as the style characteristic.

Since there are many convolutional kernels in a CNN, there will be many output matrices. Likewise, there are many convolutional layers. The output matrices of the plurality of convolutional layers after a weighted average may be used as the content characteristic or the style characteristic, and the specific weight may be set as needed. Since the style characteristic is more abstract compared to the content characteristic, the number of the convolutional layers determining the style characteristic is basically higher than the number of the convolutional layers determining the content characteristic.

Step 404, determining a content loss function based on the content characteristic of the to-be-processed picture and the content characteristic of the initial target picture.

In the present embodiment, the electronic device may determine the content loss function based on the content characteristic of the to-be-processed picture extracted in step 402 and the content characteristic of the initial target picture extracted in step 403. The content loss function may be obtained based on the mean square error of the content characteristic of the to-be-processed picture and the content characteristic of the initial target picture, and may also be obtained based on other computational methods that can represent the difference between the content characteristic of the to-be-processed picture and the content characteristic of the initial target picture. Since the CNN divides the picture into a number of convolutional slices when extracting the characteristic, the determining the content loss function is to be performed on the slices at the given position in the initial target picture and the to-be-processed picture. For example, the mean square error of the output matrices of the slices at the given position in the initial target picture and the to-be-processed picture may be calculated, and the value of the loss function may be determined by synthesizing the mean square error and the calculation results of each the slices.

Step 405, determining a style loss function based on the style characteristic of the template picture and the style characteristic of the initial target picture.

In the present embodiment, the electronic device may determine the style loss function based on the style characteristic of the template picture and the style characteristic of the initial target picture extracted in step 403. The style characteristic of the template picture may be pre-extracted or may be extracted after acquiring the user-determined template audio. The loss function may be determined based on the distance between the output matrices of each slice at the given position in the initial target picture and the to-be-processed picture. In order to make the difference between different styles more prominent, the Gram matrix of the style characteristic of the template picture and the Gram matrix of the style characteristic of the initial target picture may be respectively determined. The Gram matrix of the style characteristic may be the inner product of different convolution slices in the given convolutional layer. The loss function is then determined based on the determined Gram matrix. Likewise, the distance between the Gram matrices of the initial target picture and the to-be-processed picture output from a plurality of convolutional layers may also be weighted average to determine the loss function, and the specific weight may be set as needed.

Step 406, determining a total loss function based on the content loss function and the style loss function.

In the present embodiment, the electronic device may determine the total loss function based on the content loss function determined in step 404 and the style loss function determined in step 405. The total loss function may be obtained based on the weighted sum of the content loss function and the style loss function. By adjusting the weight of the content loss function and the weight of the style loss function, it may be determined that whether the target picture is more style-emphasized or content-emphasized.

Step 407, obtaining a target picture by adjusting the initial target picture based on the total loss function.

In the present embodiment, the electronic device may obtain the target picture by adjusting the initial target picture based on the total loss function determined in step 406. Adjusting the initial target picture is an iterative process. The value of each pixel in the initial target picture may be understood as the independent variable of the total loss function. The value of each pixel in the initial target picture in the total loss function may be derived by the gradient descent method. The purpose of the adjustment is to obtain the target picture corresponding to the minimum value of the total loss function by iteration.

Step 408, converting the target picture to a processed audio.

In the present embodiment, the electronic device may convert the target picture obtained in step 407 to a processed audio by using some digital audio editors. The processed audio may be stored locally, uploaded to a cloud or sent to other electronic devices.

By extracting feature by the CNN, determining the loss function by synthesizing the content characteristic and the style characteristic, and obtaining the target picture by iteration, the method provided by the above embodiments of the present disclosure achieves a better effect of audio fusion.

Figure 5:
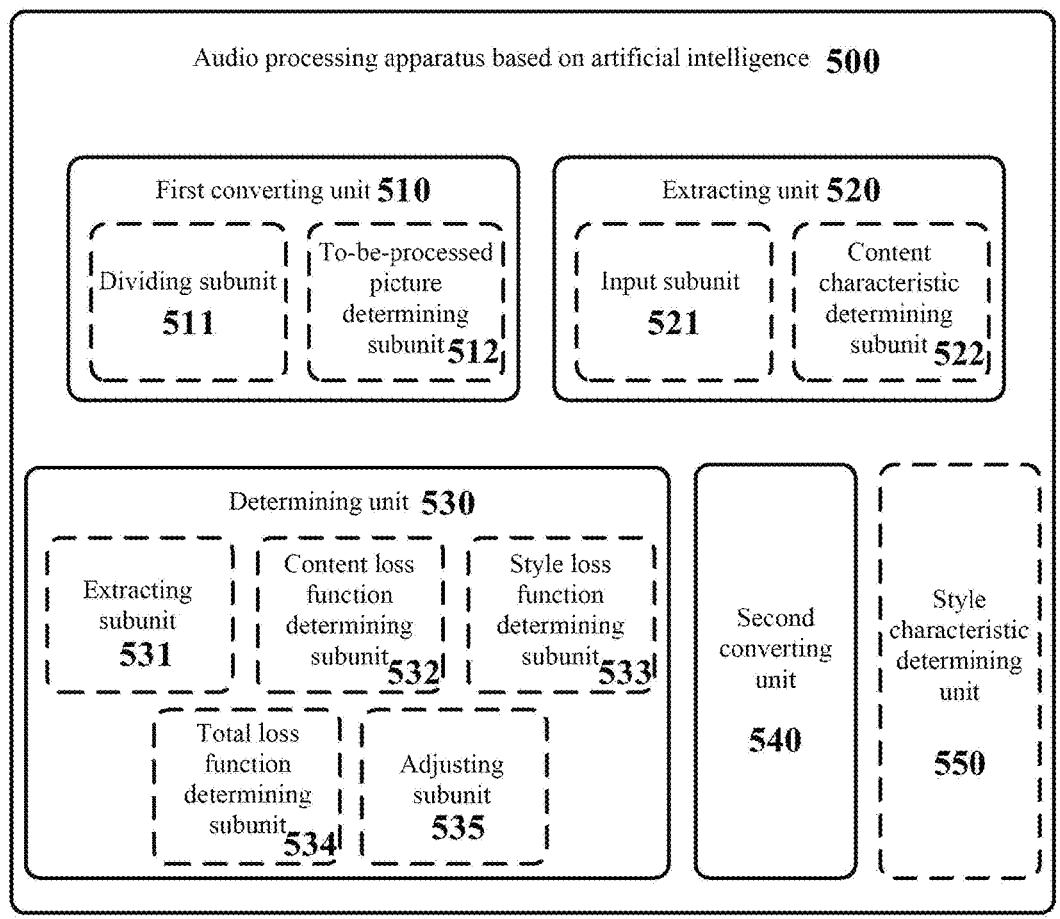
FIG. 5 is a schematic structural diagram of an embodiment of an audio processing apparatus according to the present disclosure.

With further reference to FIG. 5, as an implementation to the above method, the present disclosure provides an embodiment of an audio processing apparatus based on artificial intelligence. The apparatus embodiment corresponds to the method embodiment shown in FIG. 1, and the apparatus may be specifically applied to various electronic devices.

As shown in FIG. 5, the audio processing apparatus 500 based on artificial intelligence of the present embodiment comprises: a first converting unit 510, an extracting unit 520, a determining unit 530 and a second converting unit 540. Here, the first converting unit 510 is configured to convert a to-be-processed audio to a to-be-processed picture. The extracting unit 520 is configured to extract a content characteristic of the to-be-processed picture. The determining unit 530 is configured to determine a target picture based on a style characteristic and the content characteristic of the to-be-processed picture, the style characteristic being obtained from a template picture converted from a template audio. The second converting unit 540 is configured to convert the target picture to a processed audio.

In the present embodiment, the specific processing of the first converting unit 510, the extracting unit 520, the determining unit 530 and the second converting unit 540 may refer to the detailed descriptions to the steps 201, 202, 203, and 204 in the corresponding embodiment in FIG. 2, detailed description thereof will be omitted.

In some alternative implementations of the present embodiment, the first converting unit 510 comprises: a dividing subunit 511, configured to divide the to-be-processed audio into audio clips at a preset interval; and a to-be-processed picture determining subunit 512, configured to determine an audiogram, a spectrum, or a spectrogram of the audio clips as the to-be-processed picture.

In some alternative implementations of the present embodiment, the extracting unit 520 comprises: an input subunit 521, configured to input the to-be-processed picture into a pre-trained CNN, the CNN being used for extracting an image characteristic; and a content characteristic determining subunit 522, configured to determine a matrix output by at least one convolutional layer in the CNN as the content characteristic of the to-be-processed picture.

In some alternative implementations of the present embodiment, the apparatus further comprises: a style characteristic determining unit 550, configured to input the template picture into a pre-trained CNN, the CNN being used for extracting an image characteristic; and determine a matrix output by at least one convolutional layer in the CNN as the style characteristic of the template picture.

In some alternative implementations of the present embodiment, the determining unit 530 is further configured to: import the content characteristic of the to-be-processed picture to a preset style transfer model, and acquire an output of the style transfer model as the target picture.

In some alternative implementations of the present embodiment, the determining unit 530 comprises: an extracting subunit 531, configured to extract a content characteristic and a style characteristic of an initial target picture; a content loss function determining subunit 532, configured to determine a content loss function based on the content characteristic of the to-be-processed picture and the content characteristic of the initial target picture; a style loss function determining subunit 533, configured to determine a style loss function based on the style characteristic of the template picture and the style characteristic of the initial target picture; a total loss function determining subunit 534, configured to determine a total loss function based on the content loss function and the style loss function; and an adjusting subunit 535, configured to obtain the target picture by adjusting the initial target picture based on the total loss function.

In some alternative implementations of the present embodiment, the content loss function determining subunit 532 is further configured to: obtain the content loss function based on a mean square error of the content characteristic of the to-be-processed picture and the content characteristic of the initial target picture.

In some alternative implementations of the present embodiment, the style loss function determining subunit 533 is further configured to: determine a Gram matrix of the template picture and a Gram matrix of the initial target picture respectively, based on the style characteristic of the template picture and the style characteristic of the initial target picture; and determine the style loss function based on a mean square error of the Gram matrix of the template picture and the Gram matrix of the initial target picture.

In some alternative implementations of the present embodiment, the total loss function determining subunit 534 is further configured to: obtain the total loss function based on a weighted sum of the content loss function and the style loss function.

In some alternative implementations of the present embodiment, the adjusting subunit 535 is further configured to: obtain a minimum value of the total loss function by adjusting the initial target picture based on a gradient descent method and the total loss function; and determine the adjusted picture corresponding to the minimum value of the total loss function as the target picture.

As can be seen from FIG. 5, the apparatus 500 for the audio processing method in the present embodiment converts a to-be-processed audio to a to-be-processed picture, and then determines a target picture based on a style characteristic and a content characteristic of the to-be-processed picture, and finally converts the target picture to a processed audio. Accordingly, the present embodiment may synthesize the content characteristic of the to-be-processed picture converted from the to-be-processed audio and the style characteristic of the template picture converted from the template audio, achieves the processing effect that the processed audio takes a template audio style, improves the efficiency and the flexibility of audio processing, while without changing the content of the to-be-processed audio.

Figure 6:
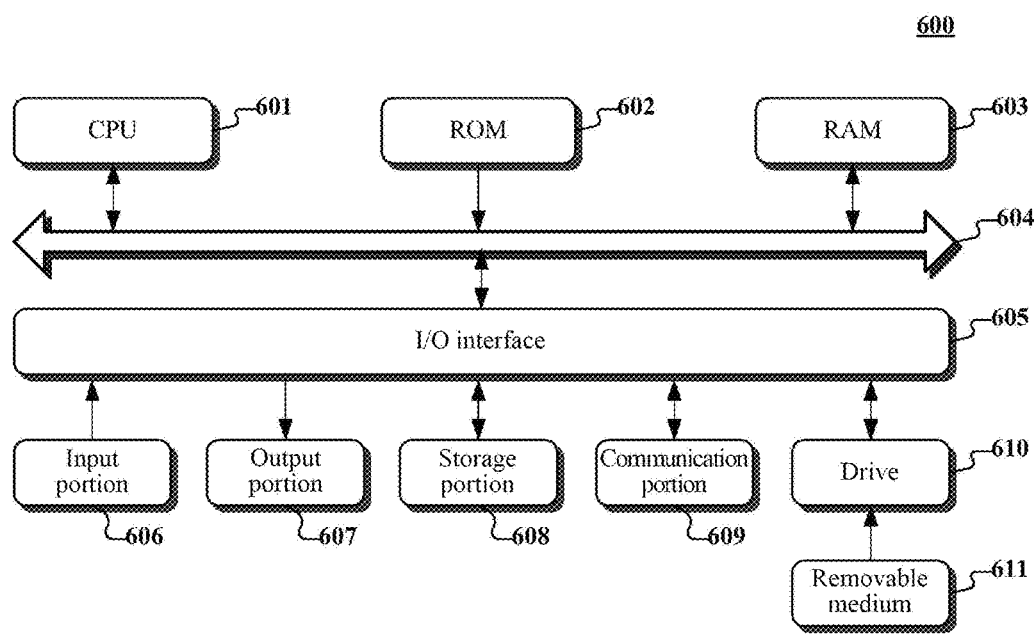
FIG. 6 is a schematic structural diagram of a computer system adapted to implement a terminal device or a server of the embodiments of the present disclosure.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a first converting unit, an extracting unit, a determining unit, and a second converting unit, where the names of these units or modules do not in some cases constitute a limitation to such units or modules themselves. For example, the first converting may also be described as "a unit for converting a to-be-processed audio to a to-be-processed picture."

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: convert a to-be-processed audio to a to-be-processed picture; extract a content characteristic of the to-be-processed picture; determine a target picture based on a style characteristic and the content characteristic of the to-be-processed picture, the style characteristic being obtained from a template picture converted from a template audio; and convert the target picture to a processed audio.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An audio processing method based on artificial intelligence, comprising:
converting a to-be-processed audio to a to-be-processed picture;
extracting a content characteristic of the to-be-processed picture;
determining a target picture based on a style characteristic and the content characteristic of the to-be-processed picture, the style characteristic being obtained from a template picture converted from a template audio; and
converting the target picture to a processed audio,
wherein the extracting a content characteristic of the to-be-processed picture comprises:
inputting the to-be-processed picture into a pre-trained convolutional neural network, the convolutional neural network being used for extracting an image characteristic; and
determining a matrix output by at least one convolutional layer in the convolutional neural network as the content characteristic of the to-be-processed picture.

2. The method according to claim 1, wherein the converting a to-be-processed audio to a to-be-processed picture comprises:
    dividing the to-be-processed audio into audio clips at a preset interval; and
    determining an audiogram, a spectrum, or a spectrogram of the audio clips as the to-be-processed picture.

3. The method according to claim 1, wherein the style characteristic is determined through the following:
    inputting the template picture into a pre-trained convolutional neural network, the convolutional neural network being used for extracting an image characteristic; and
    determining a matrix output by at least one convolutional layer in the convolutional neural network as the style characteristic of the template picture.

4. The method according to claim 1, wherein the determining a target picture based on a style characteristic and the content characteristic of the to-be-processed picture comprises:
    importing the content characteristic of the to-be-processed picture to a preset style transfer model, and acquiring an output of the style transfer model as the target picture.

5. The method according to claim 1, wherein the determining a target picture based on a style characteristic and the content characteristic of the to-be-processed picture comprises:
    extracting a content characteristic and a style characteristic of an initial target picture;
    determining a content loss function based on the content characteristic of the to-be-processed picture and the content characteristic of the initial target picture;
    determining a style loss function based on the style characteristic of the template picture and the style characteristic of the initial target picture;
    determining a total loss function based on the content loss function and the style loss function; and
    obtaining the target picture by adjusting the initial target picture based on the total loss function.

6. The method according to claim 5, wherein the content loss function is obtained based on a mean square error of the content characteristic of the to-be-processed picture and the content characteristic of the initial target picture.

7. The method according to claim 5, wherein the style loss function is determined according to the following steps:
    determining a Gram matrix of the template picture and a Gram matrix of the initial target picture respectively, based on the style characteristic of the template picture and the style characteristic of the initial target picture; and
    determining the style loss function based on a mean square error of the Gram matrix of the template picture and the Gram matrix of the initial target picture.

8. The method according to claim 5, wherein the total loss function is obtained based on a weighted sum of the content loss function and the style loss function.

9. The method according to claim 5, wherein the obtaining the target picture by adjusting the initial target picture based on the total loss function further comprises:
    obtaining a minimum value of the total loss function by adjusting the initial target picture based on a gradient descent method and the total loss function; and
    determining the adjusted picture corresponding to the minimum value of the total loss function as the target picture.

10. An audio processing apparatus based on artificial intelligence, comprising:
    at least one processor; and
    a memory storing instructions, which when executed by the at least one processor, cause the at least one processor to perform operations, the operations comprising:
    converting a to-be-processed audio to a to-be-processed picture;
    extracting a content characteristic of the to-be-processed picture;
    determining a target picture based on a style characteristic and the content characteristic of the to-be-processed picture, the style characteristic being obtained from a template picture converted from a template audio; and
    converting the target picture to a processed audio,
    wherein the extracting a content characteristic of the to-be-processed picture comprises:
    inputting the to-be-processed picture into a retrained convolutional neural network, the convolutional neural network being used for extracting an image characteristic; and
    determining a matrix output by at least one convolutional layer in the convolutional neural network as the content characteristic of the to-be-processed picture.

11. The apparatus according to claim 10, wherein the converting a to-be-processed audio to a to-be-processed picture comprises:
    dividing the to-be-processed audio into audio clips at a preset interval; and
    determining an audiogram, a spectrum, or a spectrogram of the audio clips as the to-be-processed picture.

12. The apparatus according to claim 10, wherein the style characteristic is determined through the following:
    inputting the template picture into a pre-trained convolutional neural network, the convolutional neural network being used for extracting an image characteristic; and
    determining a matrix output by at least one convolutional layer in the convolutional neural network as the style characteristic of the template picture.

13. The apparatus according to claim 10, wherein the determining a target picture based on a style characteristic and the content characteristic of the to-be-processed picture comprises:
    importing the content characteristic of the to-be-processed picture to a preset style transfer model, and acquiring an output of the style transfer model as the target picture.

14. The apparatus according to claim 10, wherein the determining a target picture based on a style characteristic and the content characteristic of the to-be-processed picture comprises:
    extracting a content characteristic and a style characteristic of an initial target picture;
    determining a content loss function, based on the content characteristic of the to-be-processed picture and the content characteristic of the initial target picture;
    determining a style loss function based on the style characteristic of the template picture and the style characteristic of the initial target picture;
    determining a total loss function based on the content loss function and the style loss function; and
    obtaining the target picture by adjusting the initial target picture based on the total loss function.

15. The apparatus according to claim 14, wherein the content loss function is obtained based on a mean square error of the content characteristic of the to-be-processed picture and the content characteristic of the initial target picture.

16. The apparatus according to claim 14, wherein the style loss function is determined according to the following steps:
   determining a Gram matrix of the template picture and a Gram matrix of the initial target picture respectively, based on the style characteristic of the template picture and the style characteristic of the initial target picture; and
   determining the style loss function based on a mean square error of the Gram matrix of the template picture and the Gram matrix of the initial target picture.

17. The apparatus according to claim 14, wherein the total loss function is obtained based on a weighted sum of the content loss function and the style loss function.

18. The apparatus according to claim 14, wherein the obtaining the target picture by adjusting the initial target picture based on the total loss function further comprises:
   obtaining a minimum value of the total loss function by adjusting the initial target picture based on a gradient descent method and the total loss function; and
   determining the adjusted picture corresponding to the minimum value of the total loss function as the target picture.

19. A non-transitory computer storage medium storing a computer program, which when executed by one or more processors, cause the one or more processors to perform operations, the operations comprising:
   converting a to-be-processed audio to a to-be-processed picture;
   extracting a content characteristic of the to-be-processed picture;
   determining a target picture based on a style characteristic and the content characteristic of the to-be-processed picture, the style characteristic being obtained from a template picture converted from a template audio; and
   converting the target picture to a processed audio,
   wherein the extracting a content characteristic of the to-be-processed picture comprises;
   inputting the to-be-processed picture into a pre-trained convolutional neural network, the convolutional neural network being used for extracting an image characteristic; and
   determining a matrix output by at least one convolutional layer in the convolutional neural network as the content characteristic of the to-be-processed picture.

* * * * *